United States Patent Office 3,127,532
Patented Mar. 31, 1964

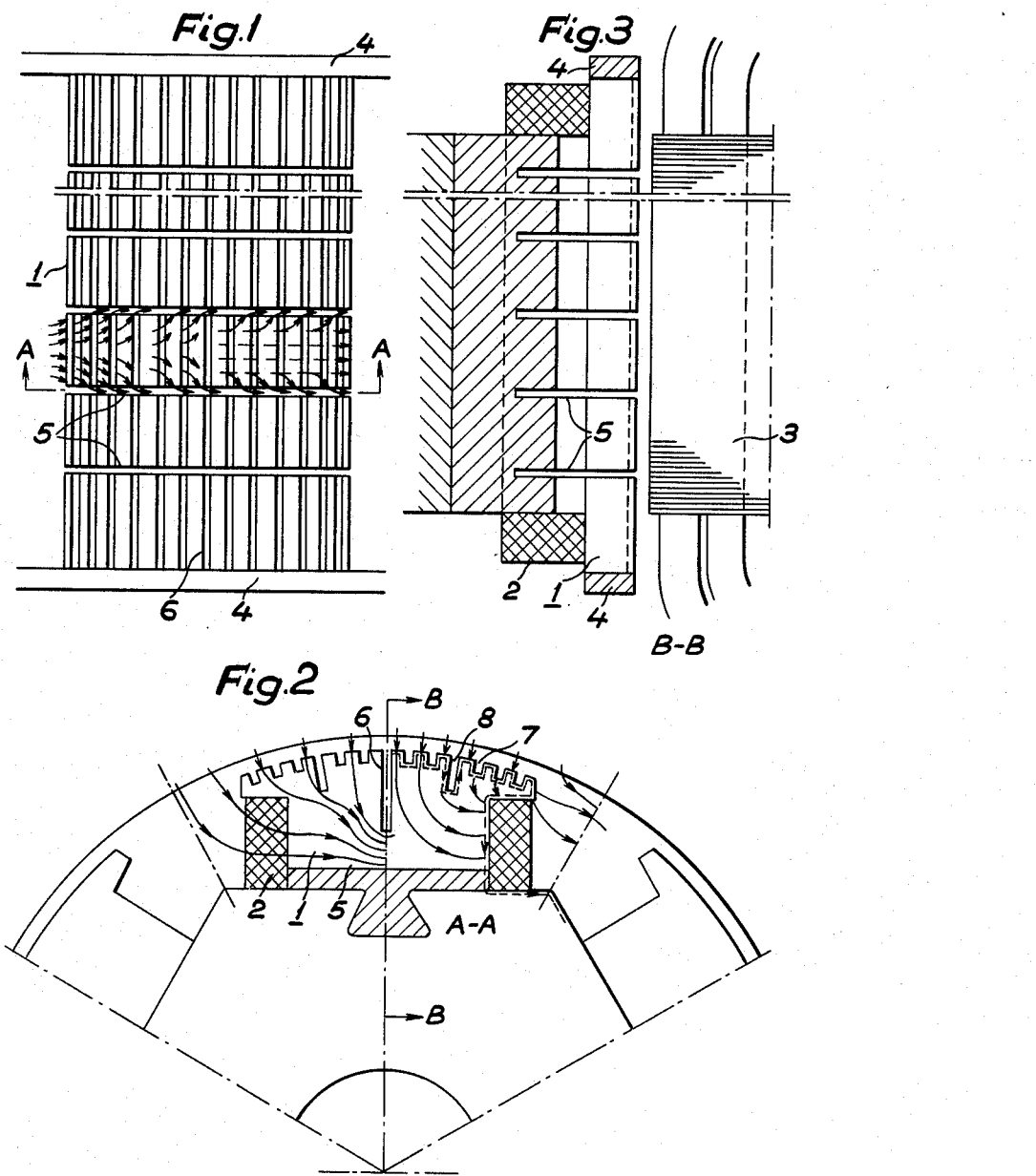

3,127,532
SOLID POLE FOR SELF-STARTING
SYNCHRONOUS MOTORS
Sven Gynt, Vasteras, Sweden, assignor to Allmanna
Svenska Elektriska Aktiebolaget, Vasteras, Sweden, a
Swedish corporation
Filed May 8, 1961, Ser. No. 108,639
Claims priority, application Sweden May 14, 1960
2 Claims. (Cl. 310—183)

The present invention relates to a form of solid pole for self-starting synchronous motors requiring a relatively great starting power.

The poles of an ordinary self-starting synchronous motor are in most cases of lamellar structure, the pole faces having slots containing a starting winding. This makes it possible to start the motor in the same way as an asynchronous motor. In order to avoid over complicated constructions the starting winding is generally merely a short-circuited winding, but then a starting resistance cannot be used in the rotor circuit and the entire heat energy developed by the rotor current during the start has to be absorbed by the starting winding. This energy is approximately proportional to the kinetic energy developed in the rotating masses during acceleration to synchronous speed, which very often makes it difficult to reach this speed without overheating the starting winding. Since the said heat energy is developed in the starting winding within a very short time, usually less than 2 minutes, the rise of temperature by acceleration of a certain mass is mainly determined by the heat-absorption quality of the starting winding. As to the starting, it would then be advantageous to have great amounts of conducting material in the starting winding, but this is usually not in conformity with the technical and economical aspects for the primary purpose of the poles. Consequently, the starting winding is generally made with such a narrow thermal safety margin that a troublesome overheating of the copper easily takes place, causing for instance a softening of the conducting material which may lead to a fatigue breakdown due to centrifugal forces.

In order to get a more robust and reliable self-starting synchronous motor, the poles have been made solid without any starting winding. The rotor current necessary for the acceleration runs in this case as eddy currents in the iron of the poles. Due to the very small depth of penetration of the alternating flux in the solid poles, said flux is conducted mainly in the outer parts of the poles near the surface. Thus for the starting flux the magnetic conductivity is determined more by the available area parallel to the flux than by the cross section area at right angles to the flux. Since the flux is conducted mainly in the surface of the poles, the eddy currents and the heat they develop are also located in the surface. During the very short starting time only a small part of the heat will reach the inner parts of the poles. Consequently their heat-absorption quality cannot be made full use of and the temperature of the surface will rise very high. With synchronous motors with great starting power said temperature may reach values causing thermal damage.

For self-starting synchronous motors with solid salient poles it is known to provide the poles with slots which are parallel with the axis of rotation, the slots containing no conducting or magnetic material, whereby a decrease of the electrical resistance is obtained in the squirrel-cage winding composed of the solid poles and short-circuiting rings at their ends. Such slots alone have no beneficial effect on the locked rotor moment of the motor, but serve the purpose of giving a large torque at high speed so that synchronising of the machine can be secured in cases where the motor is relatively heavily loaded in the final stage of the acceleration to synchronism.

For large self-starting synchronous motors, however, having a great inertia and friction at rest, or intended to be able to start when connected to equipment with such properties, the principal problem is how to obtain the necessary torque for the initial movement from rest and the subsequent further acceleration without thermal damage. With such motors it is not necessary to increase the torque near synchronism by supplying the rotor with slots parallel with the axis of relation so that the squirrel-cage resistance of the pole is decreased. On the contrary a pole construction increasing this resistance can be allowed, if such a construction is advantageous in some other respect.

The purpose of a pole construction according to the invention is to obtain as long current paths as possible, so that the heat development caused by the eddy currents can take place even in the inner parts of the pole.

The invention concerns a solid salient pole for the field magnet of a self-starting synchronous motor and is characterised in that said pole has a number of slots on the pole face, said slots being substantially perpendicular to the axis of rotation, the depth of said slots being at least as great as half the maximum thickness of the pole shoe and said slots being occupied in the main by non-magnetic and electrically non-conducting material.

The expression occupied in the main by non-magnetic and electrically non-conducting material is here defined to cover the case when the slots entirely or substantially contain air, even if the air is moving in and out of the slots.

With a pole structure according to the invention a great part of the alternating flux will be conducted in the surfaces of the slots and the starting current of the rotor and the heat developed by this current will be dispersed over a relatively great area, since the rotor current is forced to follow paths bending under the bottom of the slots.

With slots according to the invention, the alternating flux corresponding to a certain starting current in the stator is increased compared with a pole without slots or supplied only with slots parallel with the axis of rotation. Thus, it is not only possible to start the motor with a much higher stator starting current than heretofore, without thermal damage, but even to increase the locked motor torque at a certain value of the stator current.

A further equalizing of the heat development can be achieved by supplying the pole face with additional slots parallel to the axis of rotation. In this way the alternating flux is led to the inner parts of the transverse areas.

A preferred embodiment of the invention will now be particularly described with reference to the accompanying schematical drawings, of which FIGURE 1 shows a pole in accordance with the invention, seen parallel to a radius of the motor through the centre line of the pole. FIGURE 2 shows a section of the pole through the line A—A in FIGURE 1 and FIGURE 3 shows a section of the pole and the stator through line B—B in FIGURE 2. In the drawings the poles are indicated by the number 1 and in FIGURE 3 the stator is indicated by 3. In this embodiment the slots are occupied by air only and the poles are supplied with additional slots parallel to the axis of rotation.

Studying the magnetic occurrences at self-starting of the synchronous motors with distinct poles it is convenient to divide the rotating field in the air space into two components: a cross-magnetizing component and a direct field component with a mutual phase difference of 90°. The total eddy current loss will be the sum of the losses caused by each of the two component fields.

On the left side of FIGURE 2 the flux in the pole of the cross-magnetizing component field is shown schematically. The induction lines of this field enter the pole partly at the pole flank and partly at the pole face. They then run axially a short distance to the nearest transverse slot and continue following the walls of this slot across the pole. A further dispersal of the flux of the cross-magnetizing component on the surface of the transverse slots is obtained by cutting a deep longitudinal slot (6) in the middle of the pole. FIGURE 2 shows that moreover a compression of said flux is obtained between slot 6 and the bottom of slot 5, which will increase the eddy current loss in this part of the pole and thereby also the torque caused by the cross-magnetizing component of the field.

On the right side of FIGURE 2 the flux driven through the pole by the direct component of the field is shown schematically. This flux enters the pole mainly at the pole face. If transverse slots 5 are not used the induction lines will follow the pole face to the pole tip and further partly as leakage pass over to the nearest pole, partly follow the pole flank down to the rotor body as shown in dotted lines in FIGURE 2. The latter flux will link with the electric circuit of the field winding 2 and consequently the apportionment between the two paths of induction lines mentioned above will depend on the reluctance of the exciting circuit. With transverse slots 5 in the poles, part of the induction lines will flow axially in the pole face to the nearest transverse slot and further in the direction of said slot to the pole flank as shown in unbroken lines in FIGURE 2, and this special course of the flux will become more distinct if the pole surface at the air space is provided with longitudinal slots 7 and 8, since the reluctance for the peripheral flux will then increase for the benefit of the flux through the transverse slots. Consequently it is possible, especially when longitudinal slots 7 and 8 are used, to force part of the flux caused by the direct-magnetizing component field through the transverse slots 5. The slot 8 is in FIGURE 2 deeper than the slot 7, but this is shown merely as an example. The number and depth of the longitudinal slots may vary within wide ranges. The optimum depends on the general dimensions of the motor.

A further improvement can be obtained by fastening short-circuiting rings 4 at the end faces of the poles, said rings connecting all the poles to each other and being over the full contact surface in electrical contact with them.

I claim:

1. Solid salient pole piece for the field magnet of a self-starting synchronous motor, said pole having a number of slots on the pole face, said slots being substantially perpendicular to the axis of rotation, the depth of said slots being at least as great as half the maximum radial thickness of the pole piece and non-magnetic electrically non-conducting material substantially filling said slots.

2. Solid salient pole piece for the field magnet of a self-starting synchronous motor, said pole having a number of slots on the pole face, said slots comprising first slots substantially perpendicular to the axis of rotation and second slots substantially parallel to the axis of rotation, the depth of said first slots being at least as great as half the maximum radial thickness of the pole piece and non-magnetic electrically non-conducting material substantially filling all the slots.

References Cited in the file of this patent

UNITED STATES PATENTS

| | | |
|---|---|---|
| 422,681 | Wray | Mar. 4, 1890 |
| 1,449,577 | Bergstrom | Mar. 27, 1923 |
| 1,957,551 | Nieilich | May 8, 1934 |
| 2,300,520 | Pollard | Nov. 3, 1942 |
| 2,470,522 | Rankin | May 17, 1949 |
| 2,733,362 | Bauer | Jan. 31, 1956 |
| 2,989,655 | Honsinger | June 20, 1961 |